(12) United States Patent
Song (10) Patent No.: US 12,357,010 B2
(45) Date of Patent: Jul. 15, 2025

(54) METHOD FOR PRODUCING MULTIFUNCTIONAL SAUCE USING KIMCHI SEASONING, AND MULTIFUNCTIONAL SAUCE PRODUCED THEREBY

(71) Applicant: Ji Yoon Song, Chungcheongbuk-do (KR)

(72) Inventor: Ji Yoon Song, Chungcheongbuk-do (KR)

( * ) Notice: Subject to any disclaimer, the term of this patent is extended or adjusted under 35 U.S.C. 154(b) by 458 days.

(21) Appl. No.: 17/787,623

(22) PCT Filed: Dec. 8, 2020

(86) PCT No.: PCT/KR2020/017872
§ 371 (c)(1),
(2) Date: Jun. 21, 2022

(87) PCT Pub. No.: WO2021/137461
PCT Pub. Date: Jul. 8, 2021

(65) Prior Publication Data
US 2022/0408770 A1    Dec. 29, 2022

(30) Foreign Application Priority Data

Jan. 3, 2020    (KR) .................. 10-2020-0000747
Dec. 7, 2020    (KR) .................. 10-2020-0169469

(51) Int. Cl.
*A23L 23/00*    (2016.01)
*A23L 19/20*    (2016.01)
(Continued)

(52) U.S. Cl.
CPC .............. *A23L 23/00* (2016.08); *A23L 19/20* (2016.08); *A23L 27/50* (2016.08); *A23L 27/10* (2016.08)

(58) Field of Classification Search
CPC .......... A23L 27/10; A23L 27/50; A23L 19/20; A23L 23/00
See application file for complete search history.

(56) References Cited

FOREIGN PATENT DOCUMENTS

| KR | 100683948 B1 * | 2/2007 |
|---|---|---|
| KR | 10-2008-0027706 A | 3/2008 |

(Continued)

OTHER PUBLICATIONS

KR-100683948-B1 (Clarivate machine translation) (Year: 2007).*

(Continued)

*Primary Examiner* — Nikki H. Dees
*Assistant Examiner* — Andrew E Merriam
(74) *Attorney, Agent, or Firm* — KORUS Patent, LLC; Seong Il Jeong (57) ABSTRACT

The present invention relates to a method of manufacturing a multifunctional sauce using kimchi seasoning and to a multifunctional sauce manufactured by the method that can be easily stored for a long period of time without preservatives, which are inspired by producing kimchi. In addition, the multifunctional sauce using kimchi seasoning is manufactured by preparing kimchi seasoning, soy sauce seasoning, and gochujang seasoning, respectively, ripening them for 2 days, and mixing them. The multifunctional sauce using kimchi seasoning can be refrigerated at low temperature, its color and taste do not change much even after a long period of time, and it can be used to cook a number of dishes conveniently and conveniently.

3 Claims, 3 Drawing Sheets

(51) Int. Cl.
    *A23L 27/50*    (2016.01)
    *A23L 27/10*    (2016.01)

(56) References Cited

FOREIGN PATENT DOCUMENTS

| KR | 20100035454 A | * | 4/2010 |
|----|---|---|---|
| KR | 10-1042973 B1 | | 6/2011 |
| KR | 10-2015-0083561 A | | 7/2015 |
| KR | 10-2016-0135921 A | | 11/2016 |
| KR | 20170091541 A | * | 8/2017 |
| KR | 101814032 B1 | * | 1/2018 |
| KR | 20200031476 A | * | 3/2020 |

OTHER PUBLICATIONS

KR 20100035454 A (Clarivate machine translation) (Year: 2010).*
KR-20170091541-A (Clarivate machine translation) (Year: 2017).*
KR-101814032-B1 (Clarivate machine translation) (Year: 2018).*
"Homemade Korean Kimchi Recipe", Razzle Dazzle Life by Tamara J. (2020) downloaded from https://www.razzledazzlelife.com/homemade-kimchi/ on Oct. 17, 2024 (Year: 2020).*
KR 2020031476 A (Clarivate machine translation) (Year: 2020).*
"Grilled Gochujang Chicken Recipe", My Korean Kitchen (Aug. 18, 2020) downloaded on Oct. 16, 2024 fromhttps://mykoreankitchen.com/gochujang-chicken/ (Year: 2020).*

* cited by examiner

METHOD FOR PRODUCING MULTIFUNCTIONAL SAUCE USING KIMCHI SEASONING, AND MULTIFUNCTIONAL SAUCE PRODUCED THEREBY

FIELD OF THE INVENTION

The present invention relates to a method of manufacturing a multifunctional sauce using kimchi seasoning and to a multifunctional sauce manufactured by the method.

Specifically, the present invention relates to a method of manufacturing a multifunctional sauce using kimchi seasoning and a multifunctional sauce manufactured by the method, which includes steps of manufacturing kimchi seasoning using a traditional Korean method, manufacturing soy sauce seasoning and gochujang seasoning, respectively, ripening them at low temperature for 2 days, and mixing them, thereby producing a multifunctional sauce that can be stored in low temperature refrigeration for a long period of time based on the ripened materials with no preservatives as if producing kimchi.

BACKGROUND OF THE INVENTION

Kimchi was adopted as a Codex standard in September 2000, has become a recognized food in the world, and is in the spotlight as a fermented food stored in a low temperature refrigerator.

Since Kimchi has an advantage that is does not spoil even though preservatives are not added to it, if a sauce is made using such kimchi, the taste can be easily maintained without preservatives.

Therefore, the present inventor proposes a multifunctional sauce that can keep the taste and quality of the sauce without preservatives by using kimchi seasoning.

In general, soy sauce and gochujang, along with kimchi, are foods that can be made by using Korea's traditional methods.

By mixing kimchi seasoning with such soy sauce and gochujang, the mixed seasoning can be stored for a long period of time based on the advantage of kimchi seasoning, the addition of kimchi seasoning to soy sauce and gochujang can create a synergistic effect in taste, and the preference to the seasoning can be greatly increased based on kimchi seasoning.

Meanwhile, Korean Patent Publication No. 10-2008-0027706 discloses a jujube gochujang and a method of producing the same with respect to the seasoning.

The technology mentioned above relates to a jujube gochujang and a method of producing the same, which is made by 180-220 g of jujube powder, 5 Kg of Japanese apricot extract, 1-1.5 Kg of glutinous rice saccharified with a certain amount of malt, 180-220 g of ginger, 5 kg of pear juice, 1.5-2.5 kg of red pepper powder, and 180-250 g of fermented soybean powder and 200-300 g of salt.

Conventional common sauces include gochujang, soy sauce, and soybean paste. Among them, soy sauce and soybean paste exist in several Asian countries such as China, but gochujang is a unique Korean traditional food whose roots can be found in Korea.

Our food culture is rapidly becoming westernized. However, the westernized food is causing various health problems because it is not suitable for the body constitution.

Accordingly, interest in traditional food has increased, and many studies have been conducted on kimchi, soybean paste, and gochujang.

Among seasonings, traditional soybean paste may be manufactured by grinding and steaming soybeans to make meju of a certain size, leaving it in a well ventilated place to ferment it, and then aging it, and makjang may be manufactured by mixing the soybean paste with red pepper and the like. These conventional soybean paste or makjang is one of the basic foods to be dissolved in water to make soybean paste soup or stew or to be used as a dipping sauce for cucumber or pepper.

However, as mentioned above, such seasonings such as soybean paste or makjang are limited in use to soup or stew or a dipping sauce for pepper, cucumber, and the like. That is, these seasonings such as soybean paste and makjang are used only as basic main ingredients for food.

According to standards for ingredients of gochujang, gochujang should contain at least 6% of red pepper powder, 4% or more of crude protein, and 150 mg % of amino acid nitrogen in the manufacturing process, and in the case of glutinous rice gochujang or rice gochujang, it should contain 100 mg % or more of amino acid nitrogen and further contain 15% or more of glutinous rice or rice.

Recently, gochujang mixed with various delicious nutrients have started to be introduced for young generation. For example, gochujang made by adding fruit juices such as apple, orange, grape, and pineapple to gochujang or adding anchovy, kelp, and others, started to appear.

Thanks to gochujang described above, taste of traditional gochujang started to be modernized. In addition, since this improved gochujang is manufactured by using jujube powder and Japanese apricot extract, it can industrialize local specialties and assist farmers economically. Furthermore, a good taste of this improved gochujang is a good opportunity to be introduced to the world.

In addition, Korean Patent No. 10-1042973 describes a soy sauce based seasoning sauce.

The above technology relates to a method of manufacturing soy sauce based seasoning sauce rich in taste and nutrition, which includes steps of grinding onion, carrot, garlic, ginger, green onion, cabbage, radish, and apple, putting them in soy sauce, adding yellow starch syrup in the mixture of the previous step, cooking beef in boiling soy sauce, then grinding the beef and mixing it with the mixture, grinding and adding red pepper powder, red pepper seeds, kelp, and ground pepper to the mixture, and then adding the sodium glutamate to the mixture. This soy sauce based seasoning sauce can be used for various purposes, such as pork giblets, chicken ribs, stewed fish, seasoned japchae, and kimchi fried rice.

According to this trend of development of various seasoning techniques, the present applicant intends to propose a technique that can further improve a preservation period of food by using kimchi seasoning and a unique texture of soy sauce and gochujang.

DETAILED DESCRIPTION OF THE INVENTION

Technical Problems

An object of the present invention is to provide a method of manufacturing a multifunctional sauce using kimchi seasoning and a multifunctional sauce manufactured by the method that can be easily stored for a long period of time without preservatives, which are inspired by producing kimchi.

A multifunctional sauce using kimchi seasoning of the present invention can be manufactured by preparing kimchi seasoning, soy sauce seasoning, and gochujang seasoning, respectively, ripening them for 2 days, and mixing them. The multifunctional sauce using kimchi seasoning of the present invention can be refrigerated at low temperature, its color and taste do not change much even after a long period of time, and it can be used to cook a number of dishes conveniently and conveniently.

SUMMARY OF THE INVENTION

The present invention is devised to achieve the objects described above, and a method of manufacturing a multifunctional sauce using kimchi seasoning according to the present invention comprises mixing kimchi seasoning, soy sauce seasoning and gochujang seasoning.

In this case, the method comprises: a first step of manufacturing the kimchi seasoning, by mincing ingredients including cabbage, radish, carrot, onion, garlic, and green onion, heating the minced ingredients with malt syrup at 100° C. to coat the minced ingredients, and then adding red pepper powder to mix with the coated ingredients.

In addition, the method comprises: a second step of making soy sauce to have porridge texture, using kelp mucilage, by grinding ingredients including ginger, apple, and pear with soy sauce, adding red pepper seed, black pepper powder, and sodium glutamate to the ground ingredients, mixing them, and then adding kelp powder to the mixed ingredient.

In addition, the method comprises a third step of manufacturing gochujang seasoning, by mincing ingredients including garlic and onion, adding malt, apple cider vinegar, sodium glutamate, red pepper powder, and lemon lime soda to the minced ingredients, stirring evenly to mix the minced and added ingredients sufficiently, and then refrigerating the mixed ingredient at a low temperature for 2 days to ripen.

In addition, the method comprises a fourth step of mixing the kimchi seasoning manufactured by the first step and the soy sauce seasoning manufactured by the second step and refrigerating at a low temperature for 2 days to ripen.

In addition, the method comprises a fifth step of further mixing the gochujang seasoning manufactured by the third step and a mixture mixed in the fourth step to manufacture the multifunctional sauce.

In this case, the first step may be as follows.

In the first step, 250 to 300 parts by weight of the cabbage, 200 to 250 parts by weight of the radish, 170 to 200 parts by weight of the carrot, 450 to 500 parts by weight of the onion, 250 parts by weight of the garlic, 170-200 parts by weight of the green onion, 3,500 parts by weight of the malt syrup, and 1,500 parts by weight of the red pepper powder may be used.

In this case, the second step may be as follows.

In the second step, 4,500 parts by weight of the soy sauce, ginger 100-120 parts by weight of the ginger, 220-260 parts by weight of the apple, 220-250 parts by weight of the pear, 250-320 Using parts by weight of the red pepper seed, 75-90 parts by weight of the pepper powder, 105-200 parts by weight of the sodium glutamate, and 150-180 parts by weight of the kelp powder may be used.

In this case, the third step may be as follows.

In the third step, 102 parts by weight of lemon lime soda, 2,500 to 3,000 parts by weight of the gochujang, 360 to 450 parts by weight of the garlic, 250 to 300 parts by weight of the onion, 2,000 to 2,700 parts by weight of the malt syrup Use parts by weight, 0.020 parts by weight of the apple cider vinegar, 70 to 100 parts by weight of the sodium glutamate, and 204 to 300 parts by weight of the red pepper powder may be used.

In addition, the present invention includes a multifunctional sauce manufactured by the method described above and a dish manufactured by using the multifunctional sauce.

In this case, the food is exemplified as follows.

Geotjeori, also called as Fresh kimchi, which is made by washing napa cabbage, young radish, lettuce, spinach, and Korean wild chive, removing water, mixing with the multifunctional sauce using kimchi seasoning, and adding sesame oil according to the preference.

Seasoned deodeok, which is made by peeling and washing deodeok root, mincing the deodeok root with a bat, mixing with the multifunctional sauce, and adding sesame oil according to the preference. The seasoned deodeok can also be used to make Grilled deodeok.

Stewed fish, which is made by washing a fish, boiling the multifunctional sauce with vegetables including radish, onion, green onion, and others in a pot for 10 minutes, then putting the fish in the pot, adding the multifunctional sauce on top of it, and heating for 10 minutes over low heat.

Seasoned webfoot octopus, which is made by washing a zucchini, putting a little oil in a frying pan, adding onion, green onion, cabbage, carrot, and king oyster mushroom, and then adding and heating the webfoot octopus and a multifunctional sauce.

Dakgalbi, also called Spicy stir fried chicken, which is made by preparing a meat part of chicken, putting oil in a frying pan, washing the chicken cut to an edible size, adding cabbage, onion, sesame leaf, sweet potato, carrot, green onion, and king oyster mushroom, and frying it with the multifunctional sauce Grilled Hwangtae, also called as Grilled Dried Pollack, which is made by soaking a pollack in lukewarm water, removing the water, applying the multifunctional sauce, and then cooking it in a frying pan over low heat.

Dulchigi, which is made by preparing pork in slices, putting onion, green onion, carrot, king oyster mushroom, and the multifunctional sauce in a frying pan with a little oil, and stir frying all the ingredients.

Boiled chicken feet, which is made by preparing chicken feet, putting carrot, onion, green onion, and the multifunctional sauce in a frying pan, and cooking them.

Stir fry cuttlefish, which is made by preparing sliced cuttlefish, adding green onion, onion, zucchini, carrot, cabbage, and king oyster mushroom, and stir frying with the multifunctional sauce in a frying pan.

Bean sprouts bulgogi, which is made by washing bean sprouts, preparing sliced pork, putting all ingredients including green onion, onion, sesame leaf in a frying pan, and then stir frying them with the multifunctional sauce.

Seasoned beef giblet, which is made by preparing boiled beef giblet by boiling and removing smell, putting oil in a frying pan, frying the beef giblet to turn to yellow, adding onion, green onion, carrot, king oyster mushroom, shiitake mushroom, and stir frying with the multifunctional sauce.

Bacon seafood fried rice, which is made by putting margarine in a frying pan, slicing bacon, zucchini, mini cuttlefish, bean sprout, carrot and onion, adding rice later, and then stir frying with the multifunctional sauce.

Bacon seafood fish roe rice, which is made by melting margarine in a heated hot pot, stir frying with zucchini, webfoot octopus, bacon, carrot, and onion, moving the stir fried ingredients to another dish, putting rice in the hot pot first, then putting the stir fried ingredients on the top, and mixing them with the multifunctional sauce and flying fish roe.

Stir fry giblets, which is made by preparing boiled giblet, putting oil in a frying pan, and frying it to turn it to yellow, and then adding and stir frying onion, green onion, king oyster mushroom, carrot, and the multifunctional sauce.

Sausage tteokbokki, which is made by putting tteokbokki and sausage in a frying pan with oil, frying them lightly, then adding the multifunctional sauce, and cooking over low heat.

Seasoned Jokbal, which is made by preparing boiled pork feet, seasoning with the multifunctional sauce, roasting over a fire, and stir frying in a frying pan.

Jjolmyeon, which is made by boiling and washing jjolmyeon and adding and mixing the multifunctional sauce.

Braised tofu, which is made by slicing tofu, putting oil in a frying pan, heating the tofu slightly to cook, and putting the multifunctional sauce on top of the tofu in a bowl.

Bibim-guksu, also called as spicy noodle, which is made by boiling noodles, rinsing in cold water, and mixing with the multifunctional sauce.

However, the present invention is not limited to the exemplified food described above, and if food can be used with seasoning by a person skilled in the art, it should be obvious to be included in the scope of the present invention.

Technical Effects of the Invention

A method of manufacturing a multifunctional sauce using kimchi seasoning and a multifunctional sauce manufactured by the method according to the present invention is inspired by producing kimchi and can be easily stored for a long period of time without preservatives.

MODES FOR THE INVENTION

Terms or words used in the present specification and claims should not be construed as being limited to their ordinary or dictionary meanings. Based on the principle in which an inventor can appropriately define the concept of the term in order to best describe his invention, the terms or words should be construed as meanings and concepts to be consistent with the technical idea of the present invention.

Accordingly, since embodiments described in this specification and configurations shown in the drawings are only the most preferred embodiments of the present invention and do not represent all the technical spirit of the present invention, it should be understood that there may be various equivalents and modifications that can be substituted for them at the time of the present application.

In this specification, components that that are not necessary to describe the subject matter of the present invention, or well known structures that can be obviously added by those of ordinary skill in the art, are not shown or specifically described.

The present invention relates to a method of manufacturing a multifunctional sauce using kimchi seasoning and to a multifunctional sauce manufactured by the method.

Specifically, the present invention relates to a method of manufacturing a multifunctional sauce using kimchi seasoning and to a multifunctional sauce manufactured by the method, which includes steps of preparing kimchi seasoning using a traditional Korean method, preparing soy sauce seasoning and gochujang seasoning, respectively, ripening them at low temperature for 2 days, and mixing them, thereby producing a multifunctional sauce that can be stored in a low temperature refrigeration for a long period of time based on the ripened materials with no preservatives as if producing kimchi.

In particular, vegetables included in the kimchi seasoning of the present invention contain a large amount of fiber, vitamins, minerals, and the like.

In addition, since the present invention contains more garlic and onion than other ingredients, it has a high sterilization and antibacterial effect, has an inhibition function on bacterial growth, and have an improved taste by using cabbage as a substitute for napa cabbage and minced radish rather than shredded radish.

In addition, carrots are ground separately for a distinctive texture.

Furthermore, the present invention is characterized by using lemon lime soda instead of water in production of the gochujang seasoning.

Example 1. Method of Manufacturing Multifunctional Sauce Using Kimchi Seasoning

Figure 1:
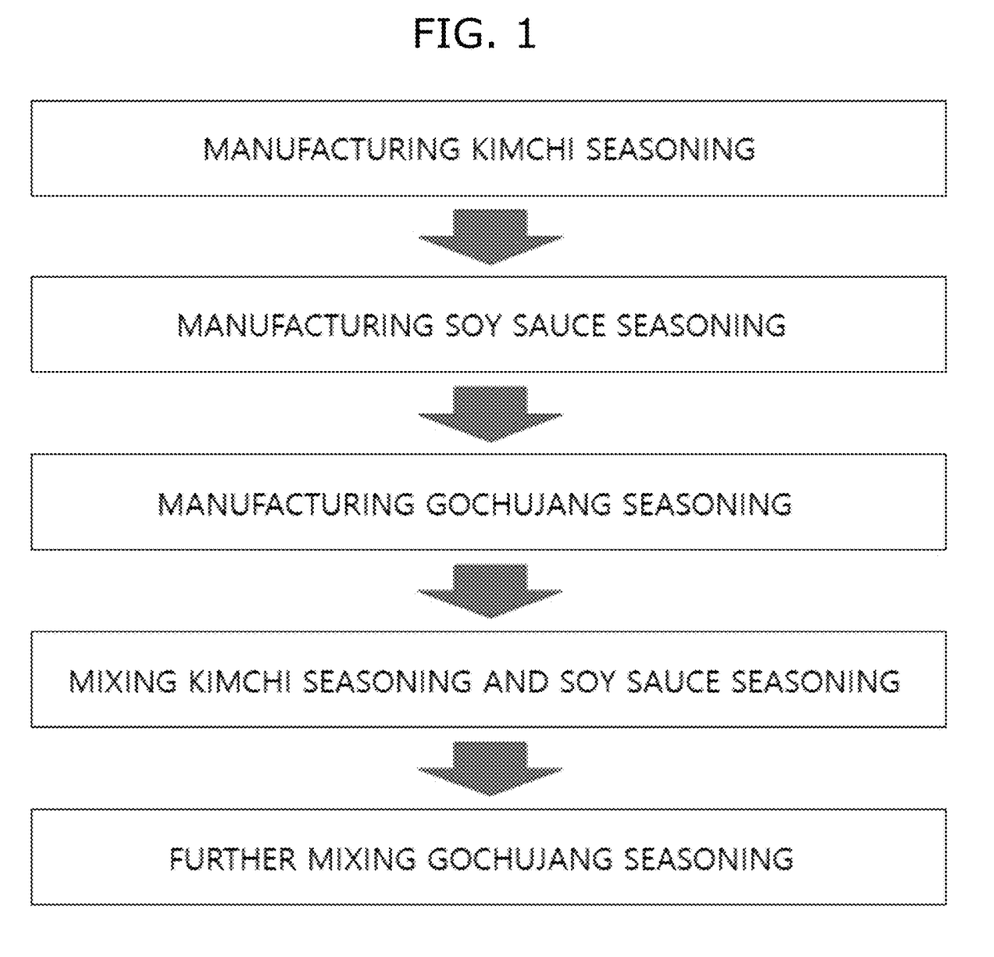
FIG. 1 is a flowchart illustrating a method of manufacturing a multifunctional sauce using kimchi seasoning according to the present invention.

1. Steps of Manufacturing Kimchi Seasoning

The steps of manufacturing kimchi seasoning are steps of mincing ingredients including cabbage, radish, carrot, onion, garlic, and green onion, heating the minced ingredients with malt syrup at 100° C. for 1 to 5 minutes to coat the minced ingredients, and then adding red pepper powder to mix with the coated ingredients.

In this case, in the steps of manufacturing kimchi seasoning, 250 to 300 parts by weight of the cabbage, 200 to 250 parts by weight of the radish, 170 to 200 parts by weight of the carrot, 450 to 500 parts by weight of the onion, 250 parts by weight of the garlic, 170-200 parts by weight of the green onion, 3,500 parts by weight of the malt syrup, and 1,500 parts by weight of the red pepper powder are used.

2. Steps of Manufacturing Soy Sauce

The steps of manufacturing soy sauce are steps of making soy sauce have porridge texture with kelp mucilage, by grinding ingredients including ginger, apple, and pear with soy sauce, adding red pepper seed, black pepper powder, and sodium glutamate to the ground ingredients, mixing them, and then adding kelp powder to the mixed ingredient.

In this case, in the steps of manufacturing soy sauce, 4,500 parts by weight of the soy sauce, ginger 100-120 parts by weight of the ginger, 220-260 parts by weight of the apple, 220-250 parts by weight of the pear, 250-320 Using parts by weight of the red pepper seed, 75-90 parts by weight of the pepper powder, 105-200 parts by weight of the sodium glutamate, and 150-180 parts by weight of the kelp powder are used.

3. Steps of Manufacturing Gochujang Seasoning

The steps of manufacturing gochujang seasoning are steps of mincing ingredients including garlic and onion, adding malt, apple cider vinegar, sodium glutamate, red pepper powder, and lemon lime soda to the minced ingredients, stirring evenly to mix the minced and added ingredients sufficiently, and then refrigerating the mixed ingredient at a low temperature for 2 days to ripen.

In this case, in the steps of manufacturing gochujang seasoning, 102 parts by weight of lemon lime soda, 2,500 to 3,000 parts by weight of the gochujang, 360 to 450 parts by weight of the garlic, 250 to 300 parts by weight of the onion, 2,000 to 2,700 parts by weight of the malt syrup Use parts by weight, 0.020 parts by weight of the apple cider vinegar, 70 to 100 parts by weight of the sodium glutamate, and 204 to 300 parts by weight of the red pepper powder are used.

4. Steps of Mixing Kimchi Seasoning and Soy Sauce Seasoning

The steps of mixing kimchi seasoning and soy sauce seasoning are steps of mixing the kimchi seasoning manufactured by the steps of manufacturing kimchi seasoning and the soy sauce seasoning manufactured by the steps of manufacturing soy sauce seasoning and then refrigerating at a low temperature for 2 days to ripen.

In this case, the steps of mixing the kimchi seasoning and the soy sauce seasoning may be performed before or simultaneously with the steps of manufacturing the gochujang seasoning described above. Accordingly, the two days required for ripening in the steps of mixing kimchi seasoning and soy sauce seasoning and the two days required for ripening in the step of manufacturing gochujang seasoning are matched in time, thereby reducing production time and efficiently manufacturing the multifunctional seasoning.

5. A Step of Further Mixing Gochujang Seasoning

The step of further mixing gochujang seasoning is a step of mixing the gochujang seasoning ripened for two days and manufactured by the steps of manufacturing gochujang seasoning into a mixture of the kimchi seasoning and the soy sauce seasoning, when the steps of mixing the kimchi seasoning and the soy sauce seasoning are completed.

Figure 2:
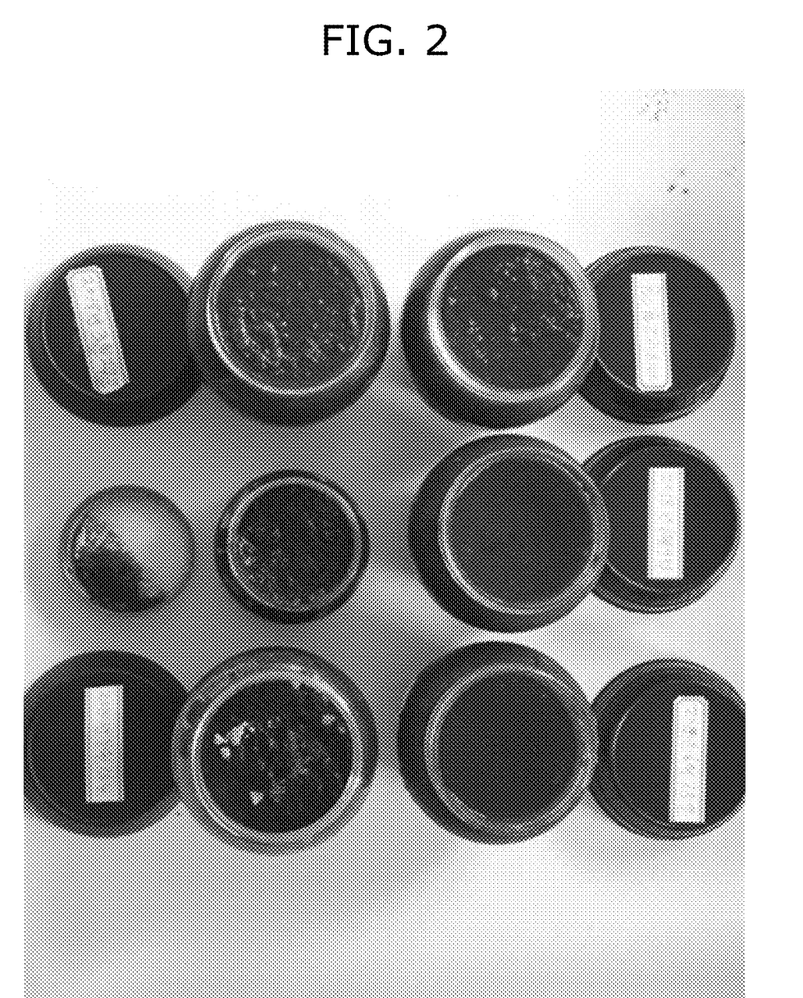
FIG. 2 illustrates a multifunctional sauce manufactured by a method of manufacturing a multifunctional sauce using kimchi seasoning according to the present invention.

This mixture is referred to as a multifunctional sauce and is stored in a refrigerator.

The multifunctional sauce manufactured in this way can be produced as a product. The multifunctional sauce can be easily refrigerated at low temperatures, and since the color and taste change very little from one to three years, the multifunctional sauce can be stored for a long time even when used at home.

Therefore, anyone can easily enjoy cooking and make various foods by using the multifunctional sauce.

Reference Example 1. Observation Table after Manufacturing Multifunctional Sauce Using Kimchi Seasoning In the Reference Example 1, as shown in [Table 1], changes in taste and color of the multifunctional sauce were observed on confirmation dates by manufacturing dates.

TABLE 1

| Manufacturing Dates (MM/DD/YY) | Confirmation Date (MM/DD/YY) | Changes in Taste | Changes in Color |
|---|---|---|---|
| Oct. 15, 2015 | May 11, 2016 | Subtle Change | No Change |
| Jun. 15, 2016 | Jun. 20, 2017 | Subtle Change | No Change |
| Mar. 27, 2017 | Feb. 7, 2018 | Subtle Change | No Change |
| Jun. 9, 2018 | Oct. 14, 2019 | Subtle Change | No Change |
| Jun. 19, 2019 | Oct. 14, 2019 | Subtle Change | No Change |
| Jun. 19, 2019 | Oct. 14, 2019 | (Stored in Room Temperature) Taste of Well Ripened Seasoning | Change to Reddish Brown |
| Oct. 15, 2015 | Feb. 7, 2018 | Deep Taste of Old Seasoning | Subtle Change |
| Jun. 15, 2016 | Oct. 14, 2019 | Deep Taste of Old Seasoning | Subtle Change |
| Oct. 15, 2015 | Oct. 14, 2019 (Check after 4 years) | Taste of Old Kimchi | Change to Reddish Brown |

TABLE 2

| Manufacturing Date (MM/DD/YY) | 1st Year Confirmation Date (MM/DD/YY) | Refrigerated Storage | 2nd Year Confirmation Date (MM/DD/YY) | Refrigerated Storage |
|---|---|---|---|---|
| Oct. 15, 2015 | May 11, 2016 | No Issue | Jun. 20, 2017 | No Issue |
| Jun. 15, 2016 | Jun. 20, 2017 | No Issue | Jun. 9, 2018 | No Issue |
| Mar. 27, 2017 | Feb. 7, 2018 | No Issue | Oct. 14, 2017 | No Issue |
| Jun. 9, 2018 | Oct. 14, 2019 | No Issue | Oct. 14, 2019 | No Issue |
| Jun. 19, 2019 | Oct. 14, 2019 | No Issue | | No Issue |
| Jun. 19, 2019 | Oct. 14, 2019 | Stored in Room Temperature | Change to Brown | Taste of Ripened Seasoning |

TABLE 3

| Manufacturing Date (MM/DD/YY) | 3rd Year Confirmation Date (MM/DD/YY) | Observation After Refrigerated Storage |
|---|---|---|
| Oct. 15, 2015 | Feb. 7, 2018 | Small white molds appeared on two spots |
| Jun. 15, 2016 | Oct. 14, 2019 | A small white mold appeared on a lid where seasoning was in contact |
| Oct. 15, 2015 | Oct. 14, 2019 (Check after 4 years) | Small white molds appeared on several spots |

The multifunctional sauce of the present invention was stored in a refrigerator according to a general method of storing food at home. The multifunctional sauce manufactured on Oct. 15, 2015 was observed on Apr. 11, 2016, and it was confirmed that there was no issue and no abnormality. However, there was a slight difference in taste, and a part where ingredients were mixed was ripened and showed a deep taste.

The multifunctional sauce manufactured on Jun. 15, 2016 showed a deep taste as a result of observation on Jun. 20, 2017.

The multifunctional sauce manufactured on Mar. 27, 2017 showed no change in color and showed a deep taste as a result of observation on Feb. 7, 2018. The multifunctional sauce manufactured in 2015 showed white molds formed in two places as a result of observation in 2018.

The multifunctional sauce manufactured on Jun. 9, 2018 showed no change in color and showed no big difference in taste as a result of observation on Oct. 14, 2019.

The multifunctional sauce manufactured on Oct. 15, 2015 turned to reddish brown in color and showed a deep taste of old kimchi as a result of observation on Oct. 14, 2019, which is 4 years from the manufacturing date.

The multifunctional sauce manufactured on Jun. 19, 2019 showed no change in color and showed no big difference in taste as a result of observation on Oct. 14, 2019.

The multifunctional sauce manufactured on Jun. 19, 2019 and stored in a room temperature turned to brown in color and showed a taste of pickle with soy sauce and deep seasoning as a result of observation on Oct. 14, 2019.

As a result of frequently checking the multifunctional sauce manufactured on Jun. 19, 2019 and studying color and taste, it is determined that the multifunctional sauce using kimchi seasoning of the present invention can be easily stored without preservatives and thus modern people can carry the multifunctional sauce with them even when they travel abroad and use it to feel the taste of Korea.

Figure 3:
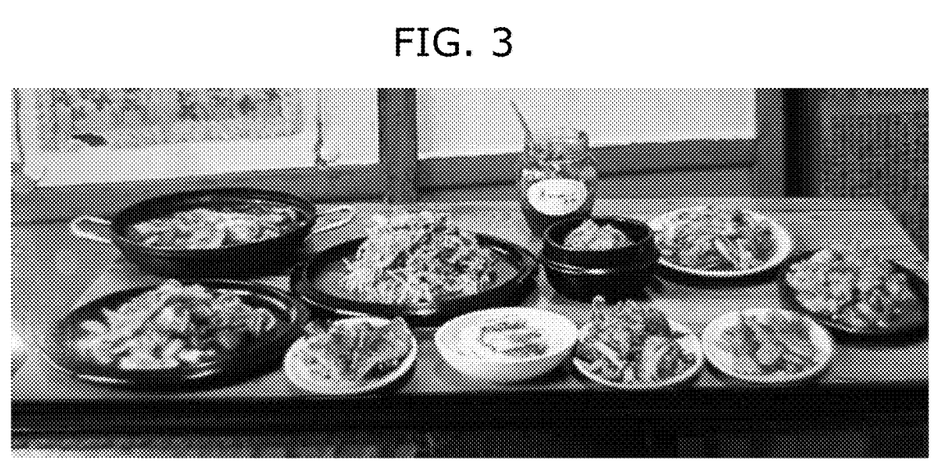
FIG. 3 illustrates dishes manufactured by using a method of manufacturing a multifunctional sauce using kimchi seasoning according to the present invention.

Reference Example 2. Exemplified Dishes Made Using Multifunctional Sauce According to Present Invention Geotjeori, also called as Fresh kimchi, which is made by washing napa cabbage, young radish, lettuce, spinach, and Korean wild chive, removing water, mixing with the multifunctional sauce using kimchi seasoning, and adding sesame oil according to the preference.

Seasoned Deodeok, which is made by peeling and washing deodeok root, mincing the deodeok root with a bat, mixing with the multifunctional sauce, and adding sesame oil according to the preference. The seasoned deodeok can also be used to make Grilled deodeok.

Stewed fish, which is made by washing a fish, boiling the multifunctional sauce with vegetables including radish, onion, green onion, and others in a pot for 10 minutes, then putting the fish in the pot, adding the multifunctional sauce on top of it, and heating for 10 minutes over low heat.

Seasoned webfoot octopus, which is made by washing a zucchini, putting a little oil in a frying pan, adding onion, green onion, cabbage, carrot, and king oyster mushroom, and then adding and heating the webfoot octopus and a multifunctional sauce.

Dakgalbi, also called Spicy stir fried chicken, which is made by preparing a meat part of chicken, putting oil in a frying pan, washing the chicken cut to an edible size, adding cabbage, onion, sesame leaf, sweet potato, carrot, green onion, and king oyster mushroom, and frying it with the multifunctional sauce Grilled Hwangtae, also called as Grilled Dried Pollack, which is made by soaking a pollack in lukewarm water, removing the water, applying the multifunctional sauce, and then cooking it in a frying pan over low heat.

Dulchigi, which is made by preparing pork in slices, putting onion, green onion, carrot, king oyster mushroom, and the multifunctional sauce in a frying pan with a little oil, and stir frying all the ingredients.

Boiled chicken feet, which is made by preparing chicken feet, putting carrot, onion, green onion, and the multifunctional sauce in a frying pan, and cooking them.

Stir fry cuttlefish, which is made by preparing sliced cuttlefish, adding green onion, onion, zucchini, carrot, cabbage, and king oyster mushroom, and stir frying with the multifunctional sauce in a frying pan.

Bean sprouts bulgogi, which is made by washing bean sprouts, preparing sliced pork, putting all ingredients including green onion, onion, sesame leaf in a frying pan, and then stir frying them with the multifunctional sauce.

Seasoned beef giblet, which is made by preparing boiled beef giblet by boiling and removing smell, putting oil in a frying pan, frying the beef giblet to turn to yellow, adding onion, green onion, carrot, king oyster mushroom, shiitake mushroom, and stir frying with the multifunctional sauce.

Bacon seafood fried rice, which is made by putting margarine in a frying pan, slicing bacon, zucchini, mini cuttlefish, bean sprout, carrot and onion, adding rice later, and then stir frying with the multifunctional sauce.

Bacon seafood fish roe rice, which is made by melting margarine in a heated hot pot, stir frying with zucchini, webfoot octopus, bacon, carrot, and onion, moving the stir fried ingredients to another dish, putting rice in the hot pot first, then putting the stir fried ingredients on the top, and mixing them with the multifunctional sauce and flying fish roe.

Stir fry giblets, which is made by preparing boiled giblet, putting oil in a frying pan, and frying it to turn it to yellow, and then adding and stir frying onion, green onion, king oyster mushroom, carrot, and the multifunctional sauce.

Sausage Tteokbokki, which is made by putting tteokbokki and sausage in a frying pan with oil, frying them lightly, then adding the multifunctional sauce, and cooking over low heat.

Seasoned Jokbal, which is made by preparing boiled pork feet, seasoning with the multifunctional sauce, roasting over a fire, and stir frying in a frying pan.

Jjolmyeon, which is made by boiling and washing jjolmyeon and adding and mixing the multifunctional sauce.

Braised tofu, which is made by slicing tofu, putting oil in a frying pan, heating the tofu slightly to cook, and putting the multifunctional sauce on top of the tofu in a bowl.

Bibim-guksu, also called as spicy noodle, which is made by boiling noodles, rinsing in cold water, and mixing with the multifunctional sauce.

Since the multifunctional sauce according to the present invention uses kimchi seasoning, red pepper powder acts as a natural preservative, and garlic and onion have sterilizing and antibacterial effects. In addition, soy sauce seasoning is added in order to prevent the multifunctional sauce from being spoiled and to prevent ripening as if kimchi ripens. Furthermore, gochujang seasoning is added to prevent discoloration due to mixing of soy sauce, and thus, changes in taste and color are very low.

In addition, since the multifunctional seasoning according to the present invention can be easily stored for a long time by low temperature refrigeration, it can be used in various places such as restaurants, catering companies, households, factories, military bases, and the like and also useful for a time consuming export process.

In addition, since the multifunctional sauce according to the present invention can be stored for a long time even when traveling abroad, it can be used consistently. In addition, since a large number of dishes can be prepared only with the sauce, the multifunctional sauce according to the present invention has excellent industrial applicability.

The explanation of the present invention above describes only the main points of the present invention using the accompanying drawings. It is obvious that various designs are possible within the technical scope of the present invention, and the present invention is not limited to the configuration of the accompanying drawings.

What is claimed is:

1. A method of manufacturing a multifunctional sauce containing kimchi seasoning, the method comprising:
   a first step of manufacturing kimchi seasoning comprising
      mincing ingredients including cabbage, radish, carrot, onion, garlic, and green onion; adding malt syrup to the minced ingredients and heating the minced ingredients with the malt syrup at 100° C. to coat the minced ingredients; and then adding red pepper powder to mix with the coated ingredients;

a second step of making soy sauce seasoning to have a porridge texture due to kelp mucilage comprising grinding ingredients including ginger, apple, and pear with soy sauce; adding red pepper seed, black pepper powder, and sodium glutamate to the ground ingredients and mixing them; and then adding kelp powder to the mixed ingredients;

a third step of manufacturing gochujang seasoning comprising mincing ingredients including gochujang, garlic and onion; adding malt syrup, apple cider vinegar, sodium glutamate, red pepper powder, and lemon lime soda to the minced ingredients; stirring evenly to mix the minced and added ingredients sufficiently; and then refrigerating the mixed ingredients at a low temperature for 2 days to ripen;

a fourth step of mixing the kimchi seasoning manufactured by the first step and the soy sauce seasoning manufactured by the second step and refrigerating the resulting mixture at a low temperature for 2 days to ripen; and a fifth step of further mixing the gochujang seasoning manufactured by the third step and the mixture mixed in the fourth step to manufacture the multifunctional sauce, wherein in the first step, 250 to 300 parts by weight of the cabbage, 200 to 250 parts by weight of the radish, 170 to 200 parts by weight of the carrot, 450 to 500 parts by weight of the onion, 250 parts by weight of the garlic, 170-200 parts by weight of the green onion, 3,500 parts by weight of the malt syrup, and 1,500 parts by weight of the red pepper powder are used;

wherein in the second step, 4,500 parts by weight of the soy sauce, 100-120 parts by weight of the ginger, 220-260 parts by weight of the apple, 220-250 parts by weight of the pear, Using parts by weight of the red pepper seed, 75-90 parts by weight of the pepper powder, 105-200 parts by weight of the sodium glutamate, and 150-180 parts by weight of the kelp powder are used;

wherein in the third step, 102 parts by weight of the lemon lime soda, 2,500 to 3,000 parts by weight of the gochujang, 360 to 450 parts by weight of the garlic, 250 to 300 parts by weight of the onion, 2,000 to 2,700 parts by weight of the malt syrup, 0.020 parts by weight of the apple cider vinegar, 70 to 100 parts by weight of the sodium glutamate, and 204 to 300 parts by weight of the red pepper powder are used.

2. A multifunctional sauce manufactured by the method of claim 1.

3. A dish comprising with the multifunctional sauce of claim 2.

* * * * *